United States Patent [19]

Jacobina

[11] Patent Number: 4,692,477

[45] Date of Patent: Sep. 8, 1987

[54] POLYISOCYANURATE FOAMS DERIVED FROM OXYPROPYLATED POLYOLS AND INSULATING STRUCTURES THEREFROM

[75] Inventor: Charles E. Jacobina, Belleair Beach, Fla.

[73] Assignee: The Celotex Corporation, Tampa, Fla.

[21] Appl. No.: 863,648

[22] Filed: May 15, 1986

[51] Int. Cl.$^4$ .............................................. C08G 18/14
[52] U.S. Cl. ................................. 521/174; 264/46.4; 264/46.6; 427/373; 428/308.4; 428/423.1; 521/176
[58] Field of Search ............... 521/174, 176; 264/46.4, 264/46.6; 427/373; 428/308.4, 423.1

[56] References Cited

U.S. PATENT DOCUMENTS

| | | | |
|---|---|---|---|
| 3,879,315 | 4/1975 | Watkinson et al. | 260/2.5 AF |
| 3,896,062 | 7/1975 | Morehouse | 260/2.5 AH |
| 3,905,924 | 9/1975 | Prokai | 260/2.5 AH |
| 3,925,266 | 12/1975 | Fabris et al. | 260/2.5 AM |
| 3,966,650 | 6/1976 | Prokai | 260/2.5 AH |
| 3,981,828 | 9/1976 | Demou et al. | 260/2.5 AC |
| 4,026,836 | 5/1977 | Zimmerman et al. | 260/2.5 AC |
| 4,026,837 | 5/1977 | Zimmerman et al. | 260/2.5 AB |
| 4,110,270 | 8/1978 | Narayan | 521/121 |
| 4,136,240 | 1/1979 | Zimmerman et al. | 521/115 |
| 4,205,136 | 5/1980 | Ohashi et al. | 521/118 |
| 4,289,858 | 9/1981 | Koehler et al. | 521/131 |
| 4,302,551 | 11/1981 | Horn et al. | 521/163 |
| 4,327,194 | 4/1982 | Chandalia et al. | 521/99 |
| 4,339,343 | 7/1982 | Koehler et al. | 252/182 |
| 4,379,757 | 4/1983 | Baskent et al. | 252/426 |
| 4,393,015 | 7/1983 | Kaneda et al. | 264/51 |
| 4,426,460 | 1/1984 | Pentz | 521/115 |
| 4,426,461 | 1/1984 | Smith | 521/116 |

*Primary Examiner*—Maurice J. Welsh
*Attorney, Agent, or Firm*—James W. Grace; Charles W. Vanecek

[57] ABSTRACT

Rigid polyisocyanurate foams are prepared by reacting together an organic polyisocyanate, a blowing agent, a trimerization catalyst, and a minor amount of a polyol, the polyol comprising a sufficient proportion of at least one polyoxyalkylene polyol having (i) terminal oxypropylene oxide blocks, (ii) a molecular weight of from about 300 to 3000, and (iii) an average hydroxyl functionality of from about 2 to 5 to form a foamed polyisocyanurate whose gel time is greater than about 70 seconds and friability is less than about 20 percent, as measured by the ASTM C-421 friability test. Laminates of such foams exhibit a high degree of fire resistance, low foam friability and good facer adhesion.

20 Claims, No Drawings

POLYISOCYANURATE FOAMS DERIVED FROM OXYPROPYLATED POLYOLS AND INSULATING STRUCTURES THEREFROM

BACKGROUND OF THE INVENTION

1. Field of the Invention

This invention relates to the preparation of polyisocyanurate foams from polyisocyanates and oxypropylated polyols, and is more particularly concerned with the use of these polyisocyanurate foams in the production of insulating panels.

2. Description of the Prior Art

Cellular polyurethane polymers are well known in the art for their use in various types of thermal insulating applications, such as refrigeration insulation, pipe and tank insulation, structural uses, e.g., preformed rigid panels, and aircraft structural parts. In these applications, the rigid polyurethane foams display excellent properties, particularly low thermal conductivity, but a great demerit of these foams is their combustibility. Various methods imparting flame-resistance to the polyurethane foams have been developed, and to date flame retardant urethane foam systems have dominated various markets for insulating materials, such as for walk-in cooler panels, building panels and pipe insulation.

It has been proposed to replace the conventional urethane foams with rigid polyisocyanurate foams which have both urethane and isocyanurate groups and good thermal stability, as well as excellent insulating capacity. While rigid isocyanurate foams, in general, are superior to rigid polyurethane foams in terms of flame resistance, smoke evolution, and thermal degradation properties, various problems have been encountered with the polyisocyanurates, such as excessive brittleness, poor abrasion resistance and poor molding characteristics. Consequently, these foams have not found wide acceptance in replacing polyurethanes in the production of insulating panels for the refrigeration industry and the like.

Futhermore, isocyanurate foam systems are historically fast reacting with cream and firm tiems of 20-60 sec. Such fast reactivities can be a major obstacle in molding large foam panel sections, resulting in nonuniform products of low strength. Unfortunately, the use of catalysts for slowing these conventional systems down to appreciably longer firm times results in foams having unacceptable properties, e.g., friability readings greater than about 25% and poor flow characteristics.

It would accordingly be highly desirable to provide an improved process for preparing polyisocyanurate foams of good quality which are particularly suited for use in insulating panels.

OBJECT OF THE INVENTION

It is therefore an object of the present invention to provide an improved process for making insulating structures, such as walk-in cooler panels, of polyisocyanurate foam without adversely affecting the physical and chemical properties of the foam.

It is another object of the present invention to provide an improved polyisocyanurate foam which is highly suitable for insulating structures, such as walk-in cooler panels, and has a combination of advantageous properties, including a reduced friability and high thermal stability, compressive strength, and insulation properties and a method of producing the foam.

It is yet another object of the present invention to provide an improved structural laminate, e.g., an insulating panel, having a rigid polyisocyanurate foam core which adheres tenaciously to at least one facing sheet and has a combination of advantageous properties, including a reduced friability and high thermal stability, compressive strength, and insulation properties and a method of producing the structural laminate.

These and other objects and advantages of the present invention will become more apparent by reference to the following specification and apended claims.

DESCRIPTION OF THE INVENTION

The above objects have been achieved and the drawbacks of the prior art have been overcome by the development of a rigid polyisocyanurate foam which is the reaction product under conventional foam-forming conditions of a polyisocyanate and an oxypropylated polyol. The urethane modified polyisocyanurate foam to be used in the insulating panels of the invention is produced by polymerizing and foaming an organic polyisocyanate with the polyol in the presence of a blowing agent, catalyst and other additives such as a surfactant and the like, as necessary. In the preparation of the polyisocyanurate foams, the polyisocyanate is reacted with a minor amount of the polyol, such as sufficient polyol to provide about 0.10 to 0.55 hydroxyl equivalents of polyol per equivalent of the polyisocyanate. The improved process and resulting polyisocyanurate foam result from the employment as the polyol component of sufficient oxypropylated polyol to lengthen the foam reaction time and thereby facilitate molding of the foam in large panel sections.

Use of the oxypropylated polyols results in isocyanurate systems whose performance in terms of flow characteristics, reactivity and general moldability is comparable to that of the urethanes. However, these isocyanurates of the invention still are characterized by the improved flame resistance and good dimensional properties inherent in trimer foams. The slow reacting system achieved, with desireably long gel times (e.g., 85–120 seconds), makes it possible to manufacture well molded foam products, such as for walk-in cooler panels, building panels and pipe insulation.

The polyol component in the present invention advantageously comprises a polyoxyalkylene polyol having a relatively high average molecular weight, such as from about 300 to 3000, and a high content of terminal oxypropylene oxide blocks sufficient to give a slow reacting polyisocyanurate foam system with, for example, a cream time of about 35 sec., a gel time of about 110 sec., and a firm time of about 130 sec. The polyether polyol has a functionality of about 2.0 to 5.0, preferably 2.5 to 4.5, and more preferably 2.5 to 3.5.

These relatively high molecular weight polyoxyalkylene polyether polyols containing predominantly terminal oxypropylene oxide blocks (i.e., also containing predominantly terminal secondary OH-groups) are produced by the usual methods. Thus, they may be obtained by the polymerization of propylene oxide and optionally a minor amount of other alkylene oxides, such as ethylene oxide, 1,2-or 2,3-butylene oxide, tetrahydrofuran, styrene oxide and/or epichlorohydrin, with the use of starter components containing reactive hydrogen atoms, such as water, polyols, ammonia or amines of polyamines or aminoalcohols. Such suitable starter components include ethylene glycol, 1,2- or 1,3-propane diol, dipropylene glycol, trimehtylol propane, glycerol, pentaerythritol, sorbitol, sucrose, 4,4'-dihydroxy diphenyl propane, aniline, ethanolamine or ethylene diamine, and are optionally used in the presence of acid or, preferably, basic catalysts. Aliphatic alcohols comprise preferred starter compounds. The polymerization reaction may be carried out in admixture with propylene oxide, but is preferably carried out in stages, with the addition of propylene oxide in the final stage, and is more preferably carried out solely with the addition of propylene oxide.

It is preferred to used polyoxyalkylene polyols having terminal oxypropylene oxide blocks in quantities by weight of the total polyol of from about 45 to 95%, more preferably 60 to 90%, and most preferably 75 to 85%. Preferred polyols are dihydric to tetrahydric polyols having a molecular weight of from about 375 to 2000, more preferably 500 to 1200, and most preferably 600 to 800.

Especially preferred polyether polyols of this invention are polypropyleneether triols obtained by the chemical addition of propylene oxide to trihydroxyl organic containing materials, such as glycerol; 1,2,6-hexanetriol; 1,1-trimethylolethane; 1,1,1-trimethylolpropane; 3-(2-hydroxyethoxy)-1,2-propanediol; 3-(2-hydroxypropoxy)-1,2-propanediol; 2,4-dimethyl-2-(2-hydroxyethoxy) methylpentanediol-1,5; 1,1,1-tris[(2-hydroxyethoxy) methyl] ethane; 1,1,1-tris[(2-hydroxypropoxy)methyl]-propane; and the like, as well as mixtures therof. A preferred group of oxypropylated triols are derived from glycerol, trimethylolpropane and 1,2,6-hexanetriol.

The preferred oxypropylated triols generally have equivalent weights from about 150 to 550, preferably 200 to 300. Especially useful oxypropylated triols have molecular weights from about 600 to 600, preferably 700 to 750. Blends of two or more oxypropylated triols having an average molecular weight and equivalent weight within the suitable ranges also can be employed.

Other conventional polyether polyols or even polyester polyols may be used in minor amounts in the foam formulations designed to produce the rigid foams of this invention. Minor amounts of these polyol additives, which may, e.g., be aliphatic diols such as diethylene glycol, may be defined as amounts which do not detract from the moldability and physical properties of the foam. The oxypropylated polyols of the invention preferably comprise at least about 90 weight %, and more preferably about 100 weight % of the polyol used in preparing the rigid foams.

In the broadest aspects of the present invention, any organic polyisocyanate can be employed in the preparation of the foams of the present invention. The organic polyisocyanates which can be used include aromatic, aliphatic and cycloaliphatic polyisocyanates and combinations thereof. Representative of these types are the diisocyanates such as m-phenylene diisocyanate, toluene-2, 4-diisocyanate, toluene-2,6-diisocyanate, mixtures of 2,4- and 2,6-toluene diisocyanate, hexamethylene-1,6-diisocyanate, tetramethylene-1, 4-diisocyanate, cyclohexane-1,4-diisocyanate, hexahydrotoluene 2,4- and 2,6-diisocyanate, naphthalene-1,5-diisocyanate, diphenyl methane-4,4'-diisocyanate, 4,4'-diphenylenediisocyanate, 3,3'-dimethoxy-4,4'-biphenyl diisocyanate, 3,3'-dimethyl-4,4'-biphenyldiisocyanate, and 3,3'-dimethyldiphenylmethane-4,4'-diisocyanate; the triisocyanates such as 4,4',4''-triphenylmethane- triisocyanate, polymethylenepolyphenyl isocyanate, toluene-2,4,6-triisocyanate; and the tetraisocyanates such as 4,4'-dimethyldiphenylmethane-2,2',5,5'--tetraisocyanate. Expecially useful are polymethylene polyphenyl polyisocyanates. These isocyanates are prepared by conventional methods known in the art such as the phosgenation of the corresponding organic amine.

In a preferred rigid foam of the invention, the organic polyisocyanate is polymethylene polyphenylisocyanate. The polymethylene polyphenylisocyanates desirably have a functionality of the least 2.1 and preferably 2.5 to 3.2. These preferred polymethylene polyphenylisocyanates generally have an equivalent weight between 120 and 180 and preferably have an equivalent weight between 130 and 145. The friability of foams made with these polyisocyanates is desireably less than 20%, preferably less than 15%.

A preferred subclass of polymethylene polyphenylisocyanates especially useful in the present invention is a mixture of those of the following formula:

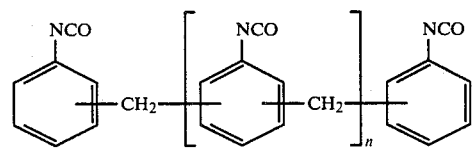

wherein n is an integer from 0 to 8 and wherein the mixture has the above-described functionality and equivalent weight. This mixture should have a viscosity (Brookfield) between 100 and 4,000 and preferably 250 to 2500 centipoises measured at 25° C. In order to be practical for use in the present invention.

Examples of suitable polymethylene polyphenylisocyanates useful in the present invention include those of the above formula, wherein n is 1 as well as mixtures wherein n can have any value from 0 to 8 as long as the mixture has the specified equivalent weight. One such mixture has 40 weight percent of n=0, 22 weight percent of n=1, 12 weight percent of n=2, and 26 weight percent of n=3 to about 8. The preferred polymethylene polyphenyl isocyanates are described in U.S. application Ser. No. 322,843, filed Jan. 11, 1973, now abandoned. The systhesis of polymethylene polyphenylisocyanates is described in Seeger et al., U.S. Pat. No. 2,683,730 and in Powers U.S. Pat. NO. 3,526,652 at column 3, lines 6-21. It should, therfore, be understood that the polymethylene polyphenylisocyanates available on the market under the tradenames of CODE 047 or PAPI-20 (Upjohn) and Mondur MR 200 (Mobay) can successfully be employed within the spirit and scope of the present invention.

In order to ensure complete reaction of the isocyanurate foams, the polyisocyanate, preferably polymethylene polyphenylisocyanate, and the polyol are generally mixed in an equivalent ratio of 1.5:1 to 6:1 preferably 2:1 to 5:1. In ranges outside these proportions the reaction tends to yield a product having less desirable physical characteristics.

Any catalyst that will induce reaction of the isocyanate with the polyol and will induce isocyanurate ring formation can be employed, provided that in foam panel production use of the catalyst results in a suitable foam reactivity profile. The preferred trimerization catalysts are those whose use gives rise to the required slow reactivity, and these catalysts can readily be identified by routine experimentation. A desirable foam reactivity profile is characterized by a cream time of from about 20 to 60, more preferably 25 to 50, and most preferably 30 to 40, sec.; a gel time of from about 70 to 130, more preferably 90 to 120, and most preferably 100 to 110, sec.; and a firm time of from about 90 to 150, more preferably 105 to 135, and most preferably 100 to 130, sec.

Most commonly used trimerization catalysts also function to catalyze the reaction of polyol and isocyanate to form urethane. However, a separate catalyst may, if desired, be used for urethane formation. The trimerization catalysts include metal carboxylates, tertiary amine trimerization catalysts, quaternary ammonium carboxylates, alkali metal alkoxides, alkali metal phenoxides and the like. Representative metal carboxylates are sodium and potassium formates, acetates, and 2-ethylhexanoates. Tertiary amine catalysts include 1,3,5-tris (N,N-dimethylaminopropyl)-s-hexahydrotriazine, o- and p-(dimethylaminomethyl) phenols and 2,4,6-tris (dimethylaminomethyl) phenol and the quaternary ammonium salts include N-hydroxyl-alkyl quaternary ammonium carboxylates and tetramethylammonium fornate, acetate, 2-ethylhexanoate and the like. Suitable urethane catalysts include, for instance, tertiary amines such as triethyl amine or dimethyl ethanol amine as well as 1,4-diaza dicyclo-octane (2,2,2) and organo tin compounds such as dibutyltin diacetate, stannous octoate and dibutyltin dilaurate.

One preferred type of catalyst is a mixture of a tertiary amino phenol, such as 2,4,6-tris(dimethylaminomethyl)phenol, and an alkali metal carboxylate, such as potassium-2-ethyl hexoate, the synthesis and use of which are described in U.S. Pat. No. 4,169,921. The disclosure of this patent is herby incorporated by reference. The equivalent ratio of tertiary amino phenol to alkali metal carboxylate in the cocatalyst composition is desireably about 0.4:1 to 2.5:1. Another catalyst system is that employing an epoxide, an N-substituted aziridine, and a tertiary amine. The systhesis and use of such a catalyst are described in U.S. application Ser. No. 251,279, filed May 8, 1972, now U.S. Pat. No. 3,799,896. The catalysts generally comprise from 0.1 to 20 and preferably from 0.3 to 10 weight percent of the total composition.

Any blowing agent typically employed in prior art foam products containing polyisocyanurate linkages can be employed in the foam composition of the present invention. In general, these blowing agents are liquids having a boiling point between minus 50° C. and plus 100° C. and preferably between 0° C. and 50° C. The preferred liquids are hydrocarbons or halohydrocarbons. Examples of suitable blowing agents include, among others, chlorinated and fluorinated hydrocarbons such as trichlorofluoromethane, $CCl_2FCClF_2$, $CCl_2FCF_3$, diethylether, isopropyl ether, n-pentane, cyclopentane, and 2-methylbutane. Trichlorofluoromethane is a preferred blowing agent. The blowing agents are employed in an amount sufficient to give the resultant foam the desired bulk density which is generally between 0.5 and 10, and preferably between 1 and 5 pounds per cubic foot. The blowing agent generally comprises from 1 to 30, and preferably comprises from 5 to 20 weight percent of the composition. When the blowing agent has a boiling point at or below ambient, it is maintained under pressure until mixed with the other components. Alternatively, it can be maintained at subambient temperatures until mixed with the other components.

Any suitable surfactant can be employed in the foams of this invention. Successful results have been obtainedd with silicone/ethylene oxide/propylene oxide copolymers as surfactants. Examples of surfactants useful in the present invention include, among others, polydimethylsiloxane-polyoxyalkylene block copolymers available from the Union Carbide Corporation under the trade names "L-5420" and "L-5340" and from the Dow Corning Corporation under the trade name "DC-193". Other suitable surfactants are those described in U.S. Pat. Nos. 4,365,024 and 4,529,745 and supplied by Jim Walter Resources, Inc. under the trademarks Foamstab 100 and 200. Generally, the surfactant comprises from about 0.05 to 10, and preferably from 0.1 to 6, weight percent of the foam-forming composition.

Other additives may also be included in the foam formulations. Included are flame retardants, such as tris(2-chloroethyl)-phosphate, dispersing agents, plasticizers, fillers and pigments.

In accordance with this invention, the rigid polyisocyanurate foams and panels can be produced by any suitable technique. In a preferred process, the isocyanate, blowing agent (e.g., fluorocarbon) and surfactant are premixed before being mixed and reacted with polyol and catalyst, although any suitable opremixture of the various ingredients can be used, e.g., a premix containing only the isocyanate and blowing agent. The ingredients of the foam-forming formulation can be mixed in any suitable manner, such as by mixing at ambient temperatures with a high speed machine, and then the foaming reaction mixture is poured into a suitable mold and allowed to cure. Curing is generally carried out at ambient or, if desired to accelerate the cure, at elevated temperatures, the permissible range being desirably about 20° C. to 90° C. for periods of time which will vary inversely with the curing temperature employed and can be from about 1 to 48 hours. The overall reaction usually is accelerated by preheating the mold at temperatures from abut 100° to 130° F. and/or employing conventional high temperature post curing procedures.

The mold will advantageously have surfacing material, such as of steel, aluminum, plastic, asbestos, felt, etc., at its inner surface. When the reaction mixture foams in the space defined by the mold, it forms an insulating panel or laminate with the facing material bonded to the resulting polyisocyanurate foam. An adhesive may be used to enhance bonding of the polyisocyanurate foam to the surface material or facer. The adhesive must be carefully selected to provide required fireproofing characteristics.

The invention is further illustrated by the following examples in which all parts and percentages are by weight unless otherwise indicated. In the specification and examples, the following abbreviations and definitions are employed:

TMP: trimethylolpropane
EO: poly(ethylene-oxy) blocks
TDA: toluenedianiline
PO: poly(propylene-oxy) blocks
HYDROXYL NUMBER: can be defined by the equation:

$$OH = \frac{56.1 \times 1000 \times f}{M.W.}$$

wherein
OH = hydroxyl number of the polyol;
f = average functionality, that is, average number of hydroxyl groups per molecule of polyol;
M.W. = average molecular weight of the polyol.

CREAM TIME: the time interval beginning with the addition of the catalyst and ending when the composition changes color from dark brown to cream colored. This color change is also accompanied by a simultaneous increase in volume. Unless otherwise indicated, the reactants are mixed at 15° C. under ambient conditions of atmospheric pressure and room temperature (25° C.).

GEL TIME: the time interval beginning with the addition of the catalyst and ending with the gel point when a self-supporting, almost firm cellular plastic forms. The gel point is the moment when the polymer growth has reached sufficient size to change the foaming mass from a liquid to a solid.

FIRM TIME: the time interval between catalyst addition and the firm point. Firm time is measured by periodically pressing by hand the top of the rising foam with a tongue depresser (a stick approximately 6 inches × ⅜ inch × 1/16 inch). When the tongue depresser no longer penetrates the surface, the time is noted. The elasped time from addition of catalyst to this point is termed the firm time.

FRIABILITY: the propensity of the foam to break expressed in percent weight loss. This is determined by the ASTM C-421 friability test conducted for 10 minutes.

EXAMPLE 1

This example illustrates the synthesis of polyisocyanurate foams utilizing oxyalkylated polyols.

The oxyalkylated polyols employed in the syntheses are shown below in Table I.

TABLE I

| Polyol | Name | Supplier | Hydroxyl Number | Equivalent Weight | Average Molecular Wt. |
|---|---|---|---|---|---|
| A | Diethylene Glycol | Union Carbide | 1055 | 53 | 106 |
| B | Isonol 93 (TMP-EO) | Upjohn | 620 | 91 | 273 |
| C | Pluracol 735 (TDA-EO) | BASF Wyandotte | 450 | 125 | 500 |
| D | Poly PA-19315-04 (Pentaerythritol EO) | BASF Wyandotte | 224 | 250 | 1000 |
| E | Pluracol 987 (Aromatic PO) | BASF Wyandotte | 235 | 239 | 717 |
| F | Pluracol 726 (Glycerin PO) | BASF Wyandotte | 58 | 967 | 2900 |
| G | Voranol 360 (Sucrose PO) | Dow Chemical | 360 | 156 | 701 |
| H | Poly G30-280 (Glycerin PO) | Olin | 274 | 205 | 615 |
| I | Polyglycol P-425 (Propylene Glycol PO) | Dow Chemical | 265 | 212 | 425 |
| J | Pluracol TP-740 (TMP-PO) | BASF Wyandotte | 232 | 242 | 726 |
| K | Voranol 2070 (Glycerin PO) | Dow Chemical | 230 | 244 | 732 |
| L | Niax LHT-240 (Hexanetriol PO) | Union Carbide | 230 | 244 | 732 |
| M | Pluracol 726/Thanol G-400 (50/50 Blend Glycerin PO) | BASF Wyandotte/ Texaco | 229 | 244 | 1660 |
| N | Pluracol TP-1540 (TMP PO) | BASF Wyandotte | 108 | 519 | 1557 |

In each foam preparation, the quantities of ingredients listed in the following Table II were added to a reaction vessel. First, a mixture of the isocyanate and fluorocarbon CFCl₃, at a temperature of 15° C., was poured into the vessel. The surfactant and oxyalkylated polyol were then added, and all ingredients were mixed at 3600 rpm for 5 seconds. The catalyst described in the table was then mixed into the contents of the vessel over a 5 second interval. All ingredients were thereafter mixed at 3600 rpm for an additional 7 seconds and then poured into a box to yield a rigid polyisocyanurate foam.

The reactivity profile and quality of the polyisocyanurate foams produced are shown in Table II. From Table II it can be seen that the polyols having terminal oxypropylene oxide blocks of the invention provided significantly improved polyisocyanurate foams in relation to the EO-capped polyols.

TABLE II

| FOAM EVALUATION OF OXYALKYLATED POLYOLS | | | | | | |
|---|---|---|---|---|---|---|
| | FOAM | | | | | |
| INGREDIENT (pts. by wt.) | 1 | 2 | 3 | 4 | 5 | 6 |
| Polymethylene polyphenyl isocyanate[1] | 277.0 | 277.0 | 277.0 | 277.0 | 277.0 | 277.0 |
| CFCl₃ | 52.0 | 52.0 | 52.0 | 52.0 | 52.0 | 52.0 |
| Surfactant | 3.0[2] | 3.0[2] | 3.0[2] | 3.0[2] | 3.0[2] | 3.0[2] |
| Polyol A | 23.0 | | | | | |
| Polyol B | | 37.5 | 37.5 | 37.5 | | |
| Polyol C | | | | | 40.0 | |
| Polyol D | | | | | | 60.0 |
| Polycat 43[3] | 1.0 | | | | | |
| Potassium Acetate | 1.0 | | | | | |
| Polycat 41[4] | | 1.0 | 1.0 | 1.0 | 1.0 | 1.0 |

TABLE II-continued
FOAM EVALUATION OF OXYALKYLATED POLYOLS

| | | | | | | |
|---|---|---|---|---|---|---|
| Dibutyl Tin Dilaurate | | | 0.5 | | | |
| (2,4,6-tris(dimethylaminomethyl) phenol | | | | 1.0 | | |
| Catalyst mixture[6] | | | | | | |
| FOAM PROPERTIES | | | | | | |
| Cream time, sec. | 80 | 30 | 20 | 20 | 15 | 25 |
| Gel time, sec. | | 95 | 40 | 60 | 50 | 130 |
| Firm time, sec. | 130 | 300 | 65 | 90 | 180 | 300 |
| Foam condition | Friable | Soft | Spongy | Friable | Soft | Friable |

| | FOAM | | | | | |
|---|---|---|---|---|---|---|
| INGREDIENT (pts. by wt.) | 7 | 8 | 9 | 10 | 11 | 12 |
| Polymethylene polyphenyl isocyanate[1] | 277.0 | 277.0 | 277.0 | 277.0 | 277.0 | 277.0 |
| CFCl$_3$ | 52.0 | 87.0 | 52.0 | 56.0 | 80.0 | 56.0 |
| Surfactant | 3.0[2] | 3.0[5] | 3.0[2] | 3.0[5] | 3.0[5] | 3.0[5] |
| Polyol D | 60.0 | | | | | |
| Polyol E | | 60.0 | | | | |
| Polyol F | | | 90.0 | | | |
| Polyol G | | | | 50.0 | | |
| Polyol H | | | | | 55.0 | |
| Polyol I | | | | | | 55.0 |
| Polycat 41[4] | 1.0 | | | | | |
| Potassium Octoate | 1.0 | | | | | |
| Catalyst mixture[6] | | 6.0 | 20.0 | 10.0 | 10.0 | 10.0 |
| FOAM PROPERTIES | | | | | | |
| Cream time, sec. | 10 | 20 | 13 | 30 | 15 | 20 |
| Gel time, sec. | 40 | 100 | 120 | 110 | 75 | 110 |
| Firm time, sec. | 60 | — | 165 | 140 | 180 | 120 |
| Foam condition | Med. Cell Structure | Friable | Coarse Celled, Friable | Med. Cell Structure; No Surface Friability | Good Appearing Foam | Med. Cell Structure; No Surface Friability |

| | FOAM | | | | |
|---|---|---|---|---|---|
| INGREDIENT (pts. by wt.) | 13 | 14 | 15 | 16 | 17 |
| Polymethylene polyphenyl isocyanate[1] | 277.0 | 277.0 | 277.0 | 277.0 | 277.0 |
| CFCl$_3$ | 52.0 | 52.0 | 52.0 | 56.0 | 56.0 |
| Surfactant | 3.0[7] | 3.0[7] | 3.0[7] | 3.0[7] | 3.0[7] |
| Polyol J | 60.0 | 60.0 | | | |
| Polyol K | | | 60.0 | | |
| Polyol L | | | | 60.0 | 60.0 |
| Polycat 43[3] | | 2.0 | 2.0 | 2.0 | |
| Catalyst mixture[6] | 5.0 | | | | 5.0 |
| FOAM PROPERTIES | | | | | |
| Cream time, sec. | 45 | 35 | 35 | 20 | 30 |
| Gel time, sec. | 75 | 90 | 90 | 70 | 85 |
| Firm time, sec. | 90 | 110 | 110 | 85 | 100 |
| Foam condition | Good Appearing Foam; No Surface Friability | Good Appearing Foam; No Surface Friability | Good Appearing Foam; No Surface Friability | Good Foam; No Surface Friability | Good Foam; No Surface Friability |

| | FOAM | |
|---|---|---|
| INGREDIENT (pts. by wt.) | 18 | 19 |
| Polymethylene polyphenyl isocyanate[1] | 277.0 | 277.0 |
| CFCl$_3$ | 52.0 | 52.0 |
| Surfactant | 3.0[5] | 3.0[2] |
| Polyol M | 60.0 | |
| Polyol N | | 75.0 |
| Polycat 43[3] | 2.0 | |
| Catalyst mixture[6] | | 5.0 |
| FOAM PROPERTIES | | |
| Cream time, sec. | 35 | 60 |
| Gel time, sec. | 115 | 85 |
| Firm time, sec. | 125 | 100 |
| Foam condition | Good Foam; No Surface | Good Foam No Surface |

TABLE II-continued
FOAM EVALUATION OF OXYALKYLATED POLYOLS

Friability       Friability

[1] Isocyanate has an equivalent weight of 138 and a viscosity of 2000 centipoises at 25° C., and is available from the Mobay Chemical Company, Pittsburgh, Pa., under the trade name MONDUR MR-200.
[2] Surfactant supplied by Jim Walter Resources, Inc. under the trade name Foamstab 100.
[3] Amine catalyst supplied by Abbott Laboratories.
[4] Amine catalyst supplied by Abbott Laboratories.
[5] Surfactant supplied by Union Carbide Corp. under the trade name L-5340.
[6] Catalyst blend of 2,4,6-tris(dimethylaminomethyl)phenol:potassium octoate:polyoxyethylene glycol 200 in a 1:3:8 weight ratio.
[7] Surfactant supplied by Dow Corning Corporation under the trade name DC-193.

EXAMPLE 2

This example illustrates the manufacture of insulating panels using various polyisocyanurate foams of the invention.

The polyisocyanurate foams of the following Table III were prepared in the same manner as described in Example 1, except that all mixed ingredients were poured into a Union Carbide "L" panel mold whose vertical section had dimensions of 30" (height)×18" (width)×1" (thickness) and horizontal bottom section had dimensions of 11" (length)×18" (width)×1" (thickness). In each panel preparation, the mold, with its inside major surfaces lined with aluminum foil, was preheated to 120° F. 775–825 grams of foamable mixture for the respective foam of Table III were introduced into the front opening of the bottom section of the mold, and allowed to foam and fill the cavity to about 80% of its height. After complete rise, the mold was placed in a 120° F. air circulating oven for 20 minutes. The foamed part was then demolded and examined for ease of edge demolding, foam adhesion to the aluminum foil, foam quality and foam flow based on the height of foam rise.

The test results reported in Table III clearly show the advantageous properties resulting from use of oxypropylated polyols in producing the polyisocyanurate foam panels of the invention, whereas use of the comparative oxyethylated polyol results in foam panels of poor quality.

4' (height)×2' (width)×4" (thickness) mold, which was preheated to 120° F. The foam was allowed to rise through the 4 ft. dimension in the closed mold. The resulting foam panel had an overall density of 2.27 pcf, and demolded well in 30 minutes at room temperature with no surface friability and with uniform cell structure.

EXAMPLE 4

This example illustrates the manufacture of a large polyisocyanurate foam panel using oxypropylated hexanetriol and polyisocyanate.

(A) In the preparation of the foam, the following quantities of the following ingredients were combined as indicated.

| Item No. | Ingredient | % by Weight |
|---|---|---|
| 1 | Polymethylene polyphenyl isocyanate | 64.87 |
| 2 | CFCl$_3$ | 18.74 |
| 3 | Surfactant | 0.70 |
| 4 | Oxypropylated hexanetriol | 14.05 |
| 5 | 2,4,6-tris(dimethylaminomethyl)phenol | 0.14 |
| 6 | Potassium octoate | 0.41 |
| 7 | Polyoxyethylene glycol | 1.09 |

Item 1 has an equivalent weight of 138 and a viscosity of 2000 centipoises at 25° C. and is available from the Mobay Chemical Company, Pittsburgh, Pa. under the

TABLE III
PROPERTIES OF FOAM PANELS

| FOAM* | OXYALKYLATED POLYOL UTILIZED | EDGE DEMOLDING | ADHESION | FOAM QUALITY |
|---|---|---|---|---|
| 1 | Oxyethylated trimethylolpropane | Poor | Poor | Friable foam; poor flow |
| 13 | Oxypropylated trimethylolpropane | Good | Good | No foam friability; medium cell structure; good flow |
| 14 | Oxypropylated glycerin | " | " | No foam friability; medium cell structure; good flow |
| 16 | Oxypropylated hexanetriol | " | " | No foam friability; medium cell structure; good flow |
| 17 | Oxypropylated glycerin (blend) | " | " | No foam friability; medium cell structure; good flow |

*Of Example 1.

EXAMPLE 3

This example illustrates the manufacture of an insulating panel made of a polyisocyanurate foam derived from oxypropylated glycerin and polyisocyanate.

The polyisocyanurate foam was prepared in the same manner as Polyisocyanurate Foam 15 of Example 1, except that a total weight of 2840 grams of ingredients were utilized and the ingredients were mixed with a drill press mixer and poured into the upper section of a trade name MONDUR MR-200.

Item 3 is suplied by Union Carbide Corp. under the trade name L-5340.

Item 4 is supplied by Union Carbide Corporation under the trade name Niax LHT-240.

Item 5 is supplied by the Rohm & Haas Company under the trade name DMP-30.

Item 6 is employed in the form of a 70 weight % solution in the polyoxyethylene glycol (Item 7) sold by the Union Carbide Corporation under the trade name Carbowax 200.

The foam was prepared using a Hennecke high pressure foam metering and dispensing machine. Items 1, 2 and 3 were premixed together as the A component (viscosity of 150 cps at 23° C.) and charged into the A component tank. Items 5, 6 and 7 were premixed together as the catalyst component (viscosity of 250 cps at 25° C.) and charged into the catalyst tank, and item 4, the B component (viscosity of 330 cps at 23° C.), was charged into the B component tank.

The A component at a temperature of 16° C. was metered and injected into one side of the high pressure impingement mixing chamber of the machine, and the B component at a temperature of 22° C. was metered and injected into the other side of this chamber. The catalyst blend was delivered at room temperature into the B component stream just before its entry into the mixing chamber.

The mixed components were then dispensed into the uper section of a 4' (height)×8' (width)×" (thickness) mold, preheated to 120° F. The foam was allowed to rise in the closed mold through the 4' dimension to produce a large foam insulated panel having the typical properties reported in the following Table IV.

TABLE IV

| EVALUATION OF FOAM PANEL | |
| --- | --- |
| FOAM PROPERTIES | VALUE |
| Cream Time, sec. | 28 |
| Gel Time, sec. | 103 |
| Density, core, pcf | 1.90 |
| Compressive Strength, psi | 26 |
| Flexural Strength, psi | 28 |
| Tumbling Friability, % wt. loss | 13 |
| Closed Cell Content, % | 90 |
| k Factor, initial | 0.123 |
| Limiting Oxygen Index, % $O_2$ | 26 |
| Flammability, ASTM E-84 | |
| Foam Thickness, in. | 4.0 |
| Flame Spread | 23 |
| Smoke | 92 |
| Dimensional Stability | |
| 28 Days, 70° C./95% R.H. Volume, max. % | 5.3 |
| 28 Days, 110° C. Volume, max. % | 1.6 |
| 28 Days, 125° C. Volume, max. % | 2.0 |
| 7 Days, 18° C. Volume, max. % | 0.0 |

(B) The procedure of part A above may be repeated with the ingredients employed in a 2-component system by adding the catalyst to the B component. Also, item 1 may be used as the sole A component with all the remaining ingredients combined as the B component.

I claim:

1. A rigid polyisocyanurate foam comprising the reaction product of an organic polyisocyanate, a blowing agent, a trimerization catalyst, and a minor amount of a polyol, the polyol comprising a sufficient proportion of at least one polyoxyalkylene polyol having (i) terminal oxypropylene oxide blocks, (ii) a molecular weight of from about 300 to 3000, and (iii) an average hydroxyl functionality of from about 2 to 5 form a foamed polyisocyanurate whose gel time is greater than about 70 seconds and friability is less than about 20 percent as measured by the ASTM C-421 friability test, and the catalyst being one whose use gives rise to the gel time of greater than about 70 seconds.

2. The rigid foam of claim 1 wherein the organic polyisocyanate is a polymethylene polyphenylisocyanate.

3. The rigid foam of claim 2 wherein the organic polyisocyanate is a mixture of components of the formula

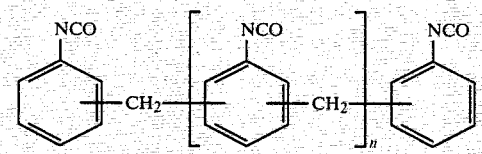

wherein n is an integer from 0 to 8 inclusive, and the mixture has:

(a) a functionality of 2.1 to 3.2,
(b) an equivalent weight between 120 and 180, and
(c) a viscosity at 25° C. between 100 and 2500 centipoises.

4. The rigid foam of claim 2 wherein the equivalent ratio of the polymethylene polyphenylisocyanate to total polyol is aobut 1.5:1 to 6:1.

5. The rigid foam of claim 4 wherein the polyoxyalkylene polyol comprises the propylene oxide adduct of an aliphatic alcohol, the polyoxyalkylene polyol having an average hydroxyl functionality of from about 2.5 to 4.5 and an equivalent weight from about 150 to 550.

6. The rigid foam of claim 5 wherein the polyoxyalkylene polyol has an average hydroxyl functionality of from about 2.5 to 3.5 and an equivalent weight from about 200 to 300.

7. The rigid foam of claim 6 wherein the polyoxyalkylene polyol comprises about 100 weight percent of the total polyol.

8. The rigid foam of claim 7 wherein the aliphatic alcohol is triol.

9. The rigid foam of claim 8 wherein the aliphatic alcohol is a member selected from the group consisting of glycerol, trimethylolpropane, 1,2,6-hexanetriol and mixtures thereof.

10. The rigid foam of claim 9 wherein the molecular weight of the polyoxyalkylene polyol is from about 700 to 750.

11. A process for producing the rigid polyisocyanurate foam of claim 1 which comprises (a) bringing together under foam-forming conditions an organic polyisocyanate, a blowing agent, a trimerization catalyst, and a minor amount of a polyol, the polyol comprising a sufficient proportion of at least one polyoxyalkylene polyol having (i) terminal oxypropylene oxide blocks, (ii) a molecular weight of from about 300 to 3000, and (iii) an average hydroxyl functionality of from about 2 to 5 to form a foamed polyisocyanurate whose gel time is greater than about 70 seconds and friability is less than about 20 percent, as measured by the ASTM C-421 friability test, and the catalyst being one whose use gives rise to the gel time of greater than about 70 seconds, and (b) foaming the foam-forming mixture.

12. The process of claim 11 wherein the organic polyisocyanate is a polymethylene polyphenylisocyanate.

13. The process of claim 12 wherein the polyoxyalkylene polyol comprises the propylene oxide adduct of an aliphatic alcohol, the polyoxyalkylene polyol having an average hydroxyl functionality of from about 2.5 to 4.5 and an equivalent weight from about 150 to 550.

14. The process of claim 13 wherein the aliphatic alcohol is a member selected from the group consisting of glycerol, trimethylolpropane, 1,2,6-hexanetriol and mixtures thereof, and the polyoxyalkylene polyol has a molecular weight of from about 700 to 750.

15. A laminate comprising at least one facing sheet adhered to a rigid polyisocyanurate foam comprising the reaction product of an organic polyisocyanate, a blowing agent, a trimerization catalyst, and a minor amount of a polyol, the polyol comprising a sufficient proportion of at least one polyoxyalkylene polyol having (i) terminal oxypropylene oxide blocks, (ii) a molecular weight of from about 300 to 3000, and (iii) an average hydroxyl functionality of from about 2 to 5 to form a foamed polyisocyanurate whose gel time is greater than about 70 seconds and friability is less than about 20 percent, as measured by the ASTM C-421 friability test, and the catalyst being one whose use gives rise to the gel time of greater than about 70 seconds.

16. The laminate of claim 15 wherein the organic polyisocyanate is a polymethylene polyphenylisocyanate.

17. The laminate of claim 16 wherein the polyoxyalkylene polyol comprises the propylene oxide adduct of an aliphatic alcohol, the polyoxyalkylene polyol having an average hydroxyl functionality of from about 2.5 to 4.5 and an equivalent weight from about 150 to 550.

18. The laminate of claim 17 wherein the aliphatic alcohol is a member selected from the group consisting of glycerol, trimethylolpropane, 1,2,6-hexanetriol and mixtures thereof, and the polyoxyalkylene polyol has a molecular weight of from about 700 to 750.

19. A process for producing the laminate of claim 15 comprising
(a) contacting at least one facing sheet with a polyisocyanurate foam-forming mixture comprising an organic polyisocyanate, a blowing agent, a trimerization catalyst and a minor amount of a polyol, the polyol comprising a sufficient proportion of at least one polyoxyalkylene polyol having (i) terminal oxypropylene oxide blocks, (ii) a molecular weight of from about 300 3000, (iii) an average hydroxyl functionality of from about 2 to 5 to form a foamed polyisocyanurate whose gel time is greater than about 70 seconds and friability is less than about 20 percent, as measured by the ASTM C-421 friability test, and the catalyst being one whose use gives rise to the gel time of greater than about 70 seconds, and
(b) foaming the foam-forming mixture.

20. The process of claim 19 wherein the foam-forming mixture is contacted with the facing sheet inside a mold heated at a temperature from about 100° to 130° F.

* * * * *